United States Patent [19]

Takeuchi et al.

[11] 4,272,877
[45] Jun. 16, 1981

[54] METHOD OF MANUFACTURING MECHANICAL PARTS FROM METAL SCRAP

[75] Inventors: Keizo Takeuchi, Handa; Yoshio Iwai; Tadashi Yamanaka, both of Nagoya; Tatsuo Miura, Kariya, all of Japan

[73] Assignee: Nippondenso Co., Ltd., Kariya, Japan

[21] Appl. No.: 911,221

[22] Filed: May 31, 1978

Related U.S. Application Data

[63] Continuation-in-part of Ser. No. 575,402, May 7, 1975.

[30] Foreign Application Priority Data

May 13, 1974 [JP] Japan .................. 49/53622
Jul. 1, 1974 [JP] Japan .................. 49/75724
Jul. 8, 1974 [JP] Japan .................. 49/78599
Jul. 24, 1974 [JP] Japan .................. 49/85476
Nov. 6, 1974 [JP] Japan .................. 49/127737

[51] Int. Cl.$^3$ ............................ B23Q 17/00
[52] U.S. Cl. ........................ 29/403.2; 29/420
[58] Field of Search ........... 29/403, 420.5, 420, 29/403.2

[56] References Cited

U.S. PATENT DOCUMENTS

| 801,274 | 10/1905 | Schulz | 29/403 |
|---|---|---|---|
| 1,725,780 | 8/1929 | Chamberlain | 29/403 |
| 2,287,951 | 6/1942 | Tormyn | 29/420.5 |
| 2,391,752 | 12/1945 | Stern | 29/403 X |
| 3,609,855 | 10/1971 | Schmidt | 29/420.5 |
| 3,626,577 | 12/1971 | Trible | 29/403 |
| 3,626,578 | 12/1971 | Price et al. | 29/403 |
| 3,629,929 | 12/1971 | Wessel | 29/420.5 |
| 3,744,118 | 7/1973 | Whalen et al. | 29/403 |
| 3,768,139 | 10/1973 | Whalen et al. | 29/403 |
| 3,774,289 | 11/1973 | Cacace et al. | 29/420.5 |
| 3,783,494 | 1/1974 | Whalen et al. | 29/420.5 |
| 3,802,932 | 4/1974 | Whalen et al. | 29/403 |
| 3,832,763 | 9/1974 | Schofer | 29/420.5 |

*Primary Examiner*—Lowell A. Larson
*Assistant Examiner*—V. K. Rising
*Attorney, Agent, or Firm*—Cushman, Darby & Cushman

[57] ABSTRACT

A method of manufacturing mechanical parts from the raw material of metal scrap such as shavings and turnings of castings and steel and press chips of steel, includes the steps of: preparing the metal scrap including shavings and turnings; forming a billet by pressing metal scrap; heating the billet to the forging temperature, whereby a satisfactory plasticity is given to the billet for plastic deformation of metal scrap in the succeeding process; and forming the heated billet into a forged workpiece by use of a semi-closed forging die. The shape of the billet is determined such that, in this forging step, the respective portions of the billet are subjected to plastic deformation having a given plastic deformation rate, whereby material flow sufficient to generate metallic bond at the respective portions is caused, and burred portions are formed on portions of the forged workpiece mainly subjected to extrusion press during die-forging.

12 Claims, 20 Drawing Figures

F I G. 1
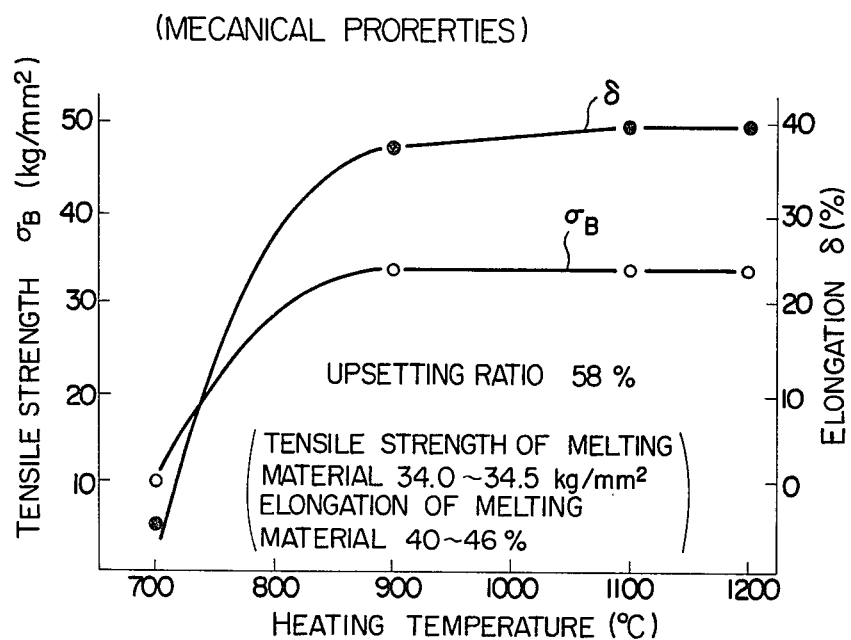
F I G. 2
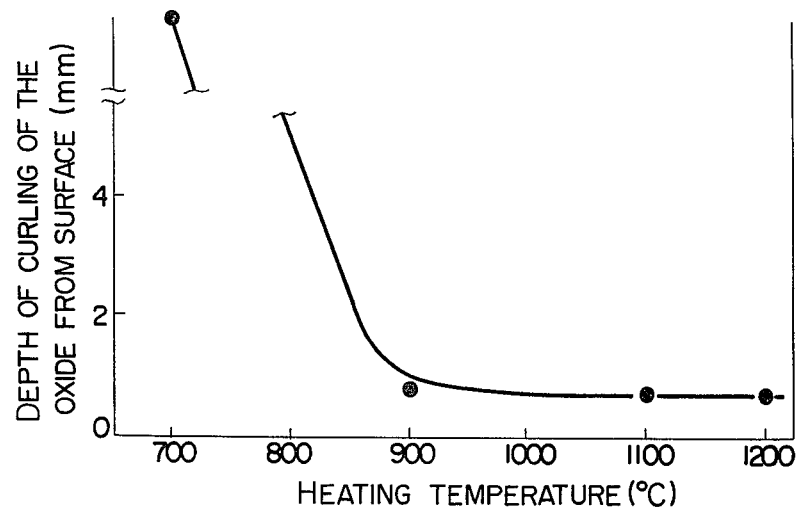

(COINING WORK)

(EXTRUSION WORK)

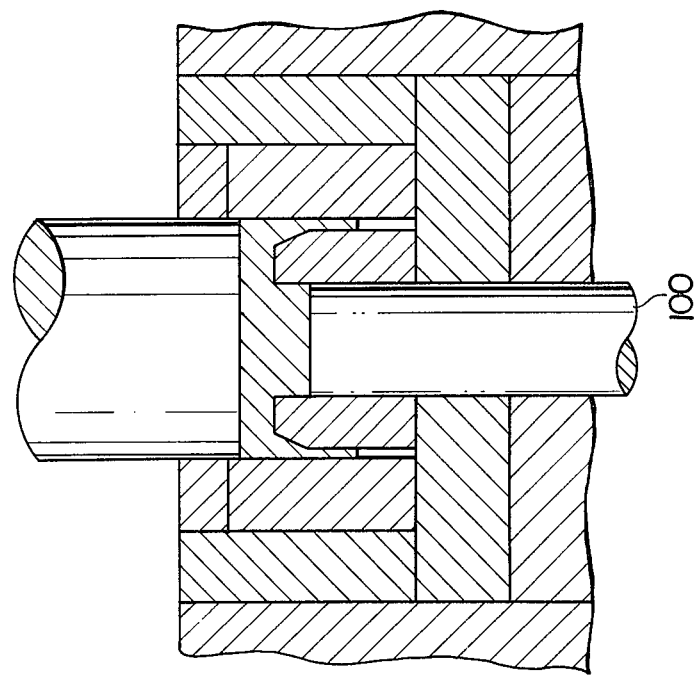
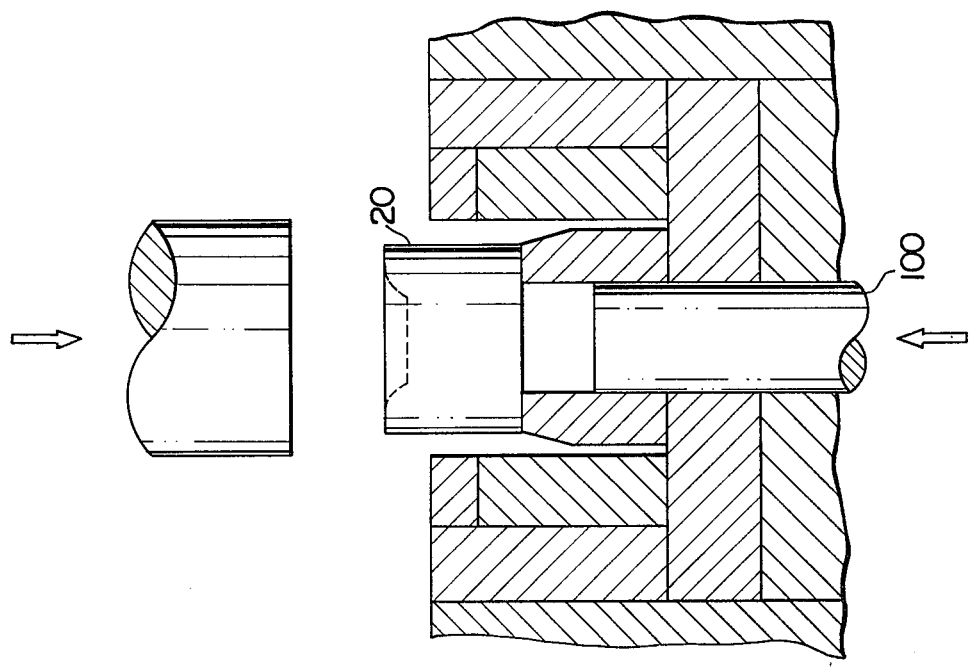

FIG. 10

| BILLET | FORGED WORKPIECE | HEIGHT OF CLAWS (mm) | FORGING PRESSURE (kg/cm²) |
|---|---|---|---|
| A: 36φ/75φ, 32, t=3 | | ~32 | ~13.5 |
| B: 30, 75φ | | ~30 | ~15 |
| C: 47, 60φ | | ~27 | ~15 |
| D: 97φ/75φ, 23 | | ~29 | ~16.5 |

METHOD OF MANUFACTURING MECHANICAL PARTS FROM METAL SCRAP

The present invention is a continuation-in-part of a copending application, Ser. No. 575,402, issued May 7, 1975; and relates to a method of manufacturing various mechanical parts from the raw material of metal scrap such as shavings and turnings of castings and steel, press chips of steel and the like.

LIST OF PRIOR ART REFERENCES (37 CFR 1.56 (a))

The following references are cited to show the state of the art:
1. U.S. Pat. No. 801,274
2. U.S. Pat. No. 1,725,780
3. U.S. Pat. No. 2,287,951
4. U.S. Pat. No. 2,391.752
5. U.S. Pat. No. 3,609,855
6. U.S. Pat. No. 3,629,929
7. U.S. Pat. No. 3,626,577
8. U.S. Pat. No. 3,626,578
9. U.S. Pat. No. 3,744,118
10. U.S. Pat. No. 3,768,139
11. U.S. Pat. No. 3,744,289
12. U.S. Pat. No. 3,783,494
13. U.S. Pat. No. 3,802,932 and
14. U.S. Pat. No. 3,832,763.

There has been broadly practised such a trial that mechanical parts are manufactured from the raw material of metal scrap recovered from the viewpoint of the effective use of materials.

For example, according to the method of utilizing metal scrap disclosed in U.S. Pat. No. 2,287,951, metal scrap made of chips, shavings, turnings and the like, or a mixture of the metal scrap with metallic powder is pressed into a billet. The billet thus produced is sintered at a sintering temperature ranging from 2000° to 2050° F., and thereafter, subjected to press work to be formed into a final mechanical part.

According to the method of utilizing metal scrap disclosed in U.S. Pat. Nos. 801,274 and 1,725,780 and the like, metal scrap is pressed into a billet for facilitating the handling of the metal scrap in the succeeding step. This billet is heated to the temperature of about 2200° F. (welding heat) and the welding between metals (metallic bond) is quickened. Thereafter, the billet is formed into a final product such as a solid sheet or bar by a method of rolling or the like.

According to the method of working on metal scrap which is described in U.S. Pat. No. 3,626,578, metal scrap is formed into a billet under cold working (at a temperature lower than the recrystallization temperature of metal scrap). The billet is heated to a temperature to as high as 2000° to 2300° F. so as to give a satisfactory plasticity to the billet for the succeeding hot working, and thereafter, is subjected to extrusion press of the consolidating step.

On the other hand, U.S. Pat. No. 3,832,763 shows the drop-forging method in which metallic powder for sintering is formed into a presintered workpiece which is formed into a final product by use of a drop-forging die. This drop-forging method contemplates to raise the density of the presintered workpiece formed by orinary sintering (normally 80 to 90% of the theoretical density) to the theoretical density. For this purpose, the presintered workpiece is subjected to drop-forging by use of the drop-forging die, whereby high material flow is caused in the presintered workpiece during drop-forging, thereby raising the density of the presintered workpiece.

Now, according to the method of utilizing metal scrap disclosed in the above U.S. Pat. Nos. 2,287,951; 801,274 and 1,725,780, the scrap pieces of metal scrap are metallically bound by thermal energy prior to the final forming step. This metallic bond is obtained by the methods including sintering, welding and the like, for example. In order to metallically bind the scrap pieces by thermal energy in the manner described above, it is necessary to heat the scrap pieces to a high temperature of sintering or welding and to maintain the scrap pieces at high temperature for a given period of time. Additionally, in order to maintain the scrap pieces at such a high temperature for a given period of time, it is necessary to prevent the metal scrap from being oxidated. For this purpose, the heating step is normally effected in reducing atmosphere. As described above, the conventional methods of utilizing metal scrap of the type described have had such disadvantages that the apparatuses are large in size, high in costs and the productivity thereof is low.

According to the method of utilizing metal scrap which is disclosed in U.S. Pat. No. 3,626,578, there is description that the billet is heated to as high as 2000° to 2300° F. prior to the final forming step (a consolidating step by extrusion) as described above. However, it is not clear as to whether metallic bond is caused to the respective scrap pieces of the billet or not. Additionally, the final forming step is extrusion, in which step consolidated bars and the like are formed. It is presumable that, in the technique of U.S. Pat. No. 3,626,578, there is a close relationship between the step of heating the billet to a temperature from 2000° to 2300° F. and the extrusion of the billet, which is the final forming step. Namely, if the heating step of the present technique known in the art is not intended to effect the metallic bond of the metal scrap pieces such as sintering or welding, but, intended to merely give the metal scrap a satisfactory plasticity for the working in the succeeding step (extrusion), then it should be concluded that it is necessary to cause metallic bond of the metal scrap pieces in the succeeding step and what makes the metallic bond possible is the working method disclosed in the above technique known in the art, i.e. the extrusion.

Further, examination will hereunder be given on the necessity of extrusion. Namely, if study is made on reasons for adoption of extrusion as the final forming step in the above technique known in the art, then it is because extrusion is the working method which comparatively easily and reliably make the metallic bond of the metal scrap pieces possible. Furthermore, it is presumable that the metallic bond is effected by material flow in the metal scrap during extrusion, and it is conceivable that the extrusion for manufacturing bars and the like can cause comparatively uniform material flow sufficient to effect metallic bond.

Accordingly, it is not easy to manufacture from metal scrap a forging fully satisfying the mechanical and physical properties by other working methods in place of extrusion in the prior art, for example, die-forging by use of a closed type or semi-closed type forging die.

From the above reasons, bars and the like have been manufactured by extrusion according to U.S. Pat. No. 3,626,578. However, in order to manufacture from the bars the mechanical parts, e.g. mechanical parts complicated in construction such as a pole core of an alternator or a pole core of a starting motor, it is necessary to perform additional plastic working and mechanical working. Consequently, even with this prior art, it cannot be said that it is one of the method by which metal scrap can be effectively and economically worked on.

Now, the phenomenon of material flow described above is one of the great factors in facilitating metallic bond of metal scrap pieces so as to manufacture a variety of mechanical parts. Namely, it is a question how and to what extent the material flow should be generated in order to obtain from the metal scrap the mechanical parts satisfying the required physical and mechanical properties. However, of the material flow, none of the above-mentioned techniques known in the art has made mention.

The technique which made mention of the material flow is the sinter forging method of the aforesaid U.S. Pat. No. 3,832,763. This sinter forging method, however, is a technique of utilizing material flow for raising the density of the presintered workpiece, but, not for metallically binding the metal scrap pieces by material flow. That is because the billet has been formed into a perfect presintered workpiece in the sintering step prior to the drop-forging. Consequently, it is unknown as to whether the billet of metal scrap in which metallic bond has not been caused can be formed into mechanical part satisfying the required physical and mechanical properties by the drop-forging according to this technique or not.

As described above, there have been proposed various working methods of manufacturing mechanical parts by utilizing metal scrap. However, none of the proposed working methods is satisfactorily effective and economical, and has not reach the stage where metal scrap is satisfactorily utilized.

Now, the present invention contemplates to provide a working method for metal scrap, wherein high productivity is achieved, the apparatus for working is compact in size and simplified in construction and highly economical, which has not even been achieved by the conventional working method. According to the working method of the present invention, metal scrap made of press chips, shavings and turnings is compressed under cold working to be formed into a billet which is heated to as high as a given forging temperature to be given a satisfactory plasticity for the plastic deformation of metal scrap in the succeeding step. Thereafter, the billet thus heated is formed into a forged workpiece by use of a semi-closed forging die. The shape of the billet is determined such that the respective portions of the billet is subjected to plastic deformation having a given plastic deformation rate, whereby material flow sufficient to produce metallic bond at the respective portions to be subjected to plastic deformation is caused. And burred portions are formed on at least a portion of the forged workpiece mainly subjected to extrusion press.

BRIEF DESCRIPTION OF THE DRAWINGS

FIG. 1 is a graphic chart showing the mechanical properties including tensile strength and elongation at various heating temperatures of the forged wrokpiece produced from a billet of metal scrap having a density of about 7 g/cm$^3$ subjected to upsetting at the upsetting ratio of 58%);

FIG. 2 is a graphic chart showing the depth of curling, from the surface at various heating temperatures, of the oxide disposed on the surface of the forged working shown in FIG. 1;

FIG. 8(A) is a sectional view showing construction of the die of the press machine for forging when the billet is set in the die of the press machine, and FIG. 8(B) is a sectional view showing the press machine when the billet has been forged;

FIG. 10 is a graphic chart showing the height of the claws and the forging pressures when four types of billets are die-forged according to the present invention;

GENERAL CONCEPT OF THE PRESENT INVENTION

Figure 3:
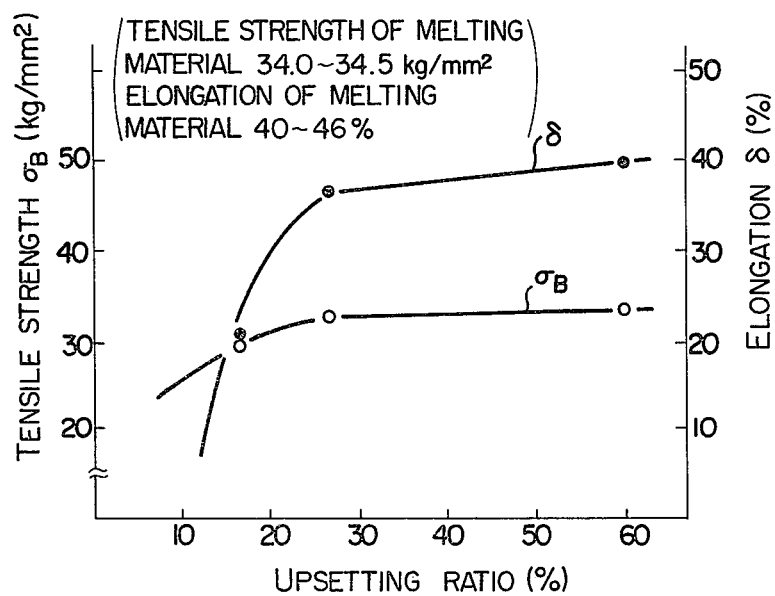
FIG. 3 is a graphic chart showing the characteristics of variation in tensile strength and elongation that are included in the mechanical properties according to the variation in upsetting ratio of the forged workpiece which is produced from a billet of metal scrap subjected to coining.

What come into question when mechanical parts are manufactured from metal scrap are that the density of the compact should be raised and the metallic bond should be caused as uniform as possible to obtain the mechanical properties substantially equalling to the melting material used as the raw material. For the raising of the density, a substantially satisfactory density is obtainable by ordinary press working. However, for the metallic bond of scrap pieces, the metallic bond is not obtainable by mere press working (compression). Then, heretofore there has been such a common practice that, firstly, the billet is subjected to the heating step such as sintering or welding so as to obtain the metallic bond, and thereafter, subjected to the final forming step so as to obtain a given shape. However, the present invention proposes a method in which the billet is not subjected to the heating process for particularly causing the metallic bond to the billet, and only one die-forging step is performed to raise the density of metal scrap and cause the metallic bond of the scrap pieces. In the case that the working method according to the present invention is performed, it is necessary to consider two critical factors, i.e. the heating step wherein the billet is heated to a given temperature prior to the die-forging step, and the extent of deformation to which metal scrap is subjected during die-forging step, i.e. the upsetting ratio and the reduction of area (hereinafter those are generally referred to as the "plastic deformation rate"). Then, the present inventors have sought the preferable ranges of the temperatures and the plastic deformation rates.

The billet of metal scrap (Material quality: SPCC, DSCI) of rolled plates of ordinary carbon steel is heated in a radiofrequency induction heating furnace and subjected to upsetting at the upsetting ratio of 58% so as to obtain a compact. The measurements were conducted on the mechanical properties (tensile strength and elongation) and the depth of surface imperfection. FIGS. 1 and 2 show the measured values at the heating temperatures of 700°, 900°, 1000° and 1200° C., respectively. Since this heating step is conducted in a radiofrequency induction heating furnace, it suffices to heat for scores of seconds, and therefore, it is not necessary to conduct this heating step in reducing atmosphere. Additionally, this heating step is not intended to cause the metallic bond (metallic bond such as sintering and welding) of metal scrap pieces by thermal energy, but, to give satisfactory plasticity for the plastic deformation in the succeeding step and to give activity to the surfaces of the metal scrap pieces for facilitating the metallic bond at the time of plastic deformation. Consequently, the heating time can be as short as scores of seconds. If the metallic bond of the metal scrap pieces is to be effected in this heating step, then the heating time should be as long as scores of minutes to two-three hours, and for this purpose, the heating step is required to be done in reducing atmosphere. As has been described, the present invention is not intended to effect the metallic bond of metal scrap pieces in the heating step. However, even if the metallic bond occurs, the metallic bond will not deny the working method of the present invention. As will be described hereinafter, the point is to provide the working method in which, even if the metallic bond is not caused to the metal scrap pieces, such mechanical parts can be manufactured by only one die-forging process, which satisfactorily meet the physical and mechanical properties.

Referring back to FIGS. 1 and 2, the tensile strength and the elongation of the compact subjected to upsetting at a temperature lower than 900° C. are very low as compared with that of the melting material. However, the mechanical properties of the billet heated to a temperature higher than 900° C. and subjected to upsetting at the upsetting ratio of 58% attained the values substantially equalling to that of the melting material. Additionally, it is understood from FIG. 2 that, if the heating temperature is lower than 900° C., the appearance of the final compact becomes bad. This is because, with the decrease of the heating temperature from 900° C., the quantity of oxide dragged into the surface of the compact increases and the depth thereof from the surface increases.

Consequently, as viewed from FIGS. 1 and 2, it is concluded that the heating temperature is required to be higher than 900° C. On the other hand, the mechanical properties and the depth of surface imperfection when the heating temperature is 1100° C. to 1200° C. are practically almost same as that when the heating temperature is 900° C. Therefore, there is no need to heat to as high as 1100° C. to 1200° C., but, the heating temperature is preferably lower than 1000° C. from the viewpoints of better service life of the die of the press machine, improved energy consumption and the like.

Figure 4:
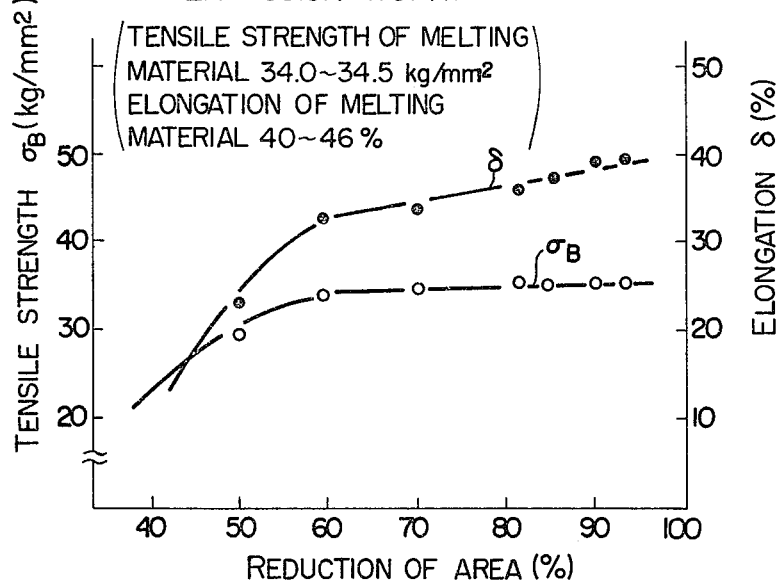
FIG. 4 is a graphic chart showing the characteristics of variation in tensile strength and elongation that are included in the mechanical properties according to the variation in reduction of area of the forged workpiece which is produced from a billet of metal scrap subjected to extrusion press.

Description will hereunder be given of FIGS. 3 and 4. In the case the final mechanical part (a pole core of an alternator in the present application) is manufactured by press working, the respective portions of the billet before the press working are formed into the final compact by coining, extrusion, combination of coining and extrusion or the like. It is expected that the mechanical properties of the portion subjected to coining are not necessarily the same as that of the portion subjected to extrusion. Therefore, in order to manufacture the final compact which is satisfactory as a mechanical part, the portions subjected to coining, extrusion, combination of coining and extrusion, respectively, shall have the mechanical properties similar to or higher than the melting material used as the material. For this purpose, the mechanical properties subjected to different types of working should be clarified.

Then, the present inventors conducted investigations on the mechanical properties by subjecting the billets of metal scrap (material quality: SPCC, DSCI) to plastic deformation for each type of working (upsetting and extrusion). At that time, the tensile strength and the elongation were measured varying the upsetting ratio of upsetting working and the reduction of area of extrusion working, respectively. The measured values are shown in FIGS. 3 and 4. As apparent from FIGS. 3 and 4, the portions subjected to upsetting and extrusion showed the characteristic mechanical properties, respectively. Additionally, it was found that the mechanical properties of the compacts subjected to upsetting at an upsetting ratio of about 30% and more or subjected to extrusion at a reduction of area of about 60% and more, the mechanical properties of the compacts subjected to the two workings described above are substantially the same as that of the melting material. Consequently, in the case individual mechanical parts are formed from metal scrap, it becomes necessary to investigate what working the portions metal scrap are subjected to and determine the shape of the billet so that the plastic deformation rate (upsetting ratio and reduction of area) commensurate to the type of working can be performed.

Then, the present inventors subjected a billet of metal scrap (a pole core of an alternator as a specific mechanical part) to plastic deformation at the plastic deformation rate including the upsetting ratio of more than 30% and the reduction of area of more than 60%, thereby achieving success in manufacturing a mechanical part satisfactorily meeting the required mechanical properties as will be described hereinafter.

Next, the present inventors examined the adding amount of the lubricant (powder of zinc stearate) to be mixed with metal scrap for the purpose of improving the handling of the billet when the billet is formed.

Figure 5:
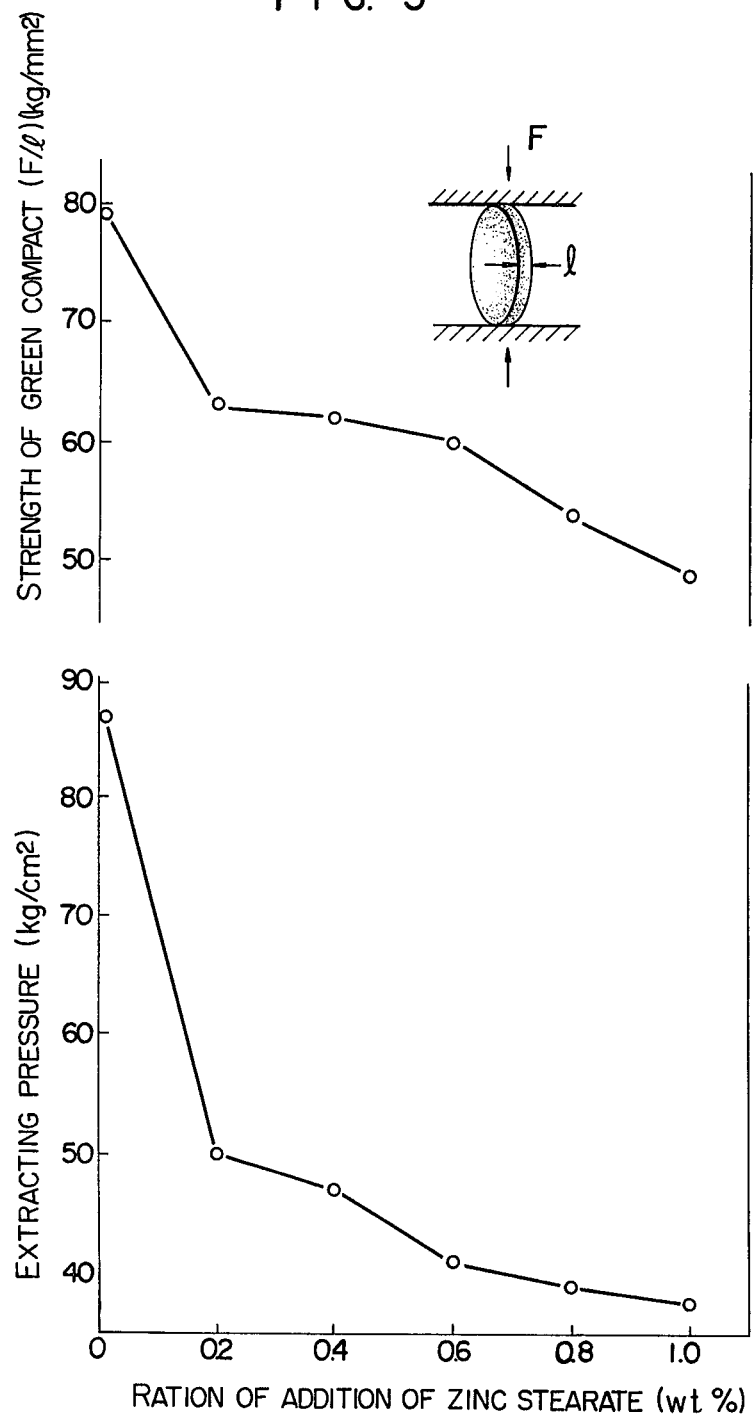
FIG. 5 is a graphic chart showing the strength of the green compact and the characteristics of extracting pressure of a billet according to the variation in adding ratio of zinc stearate to the billet when the billet is produced from metal scrap mixed with zinc stearate.

Metal scrap composed of press chips, shavings and turnings less than of 3 mesh is mixed with a given weight percent of zinc stearate, subjected to cold pressing under the compression load of substantially 6 to 7 ton/cm$^2$, and formed into the billet (average density: 6.9 to 7.0 g/cm$^3$). Then, the strength of the billet (strength of a green compact) and the force required for extracting the billet from the press die (extracting pressure) are measured varying the adding ratio of zinc stearate, and the results of the measurement are shown in FIG. 5. As apparent from FIG. 5, if the adding ratio of zinc stearate to the metal scrap is less than 0.2 weight %, then the force required for extracting the billet from the die of the press machine (extracting pressure) becomes extremely large to thereby contribute to shorten the service life of the die. Additionally, if the adding ratio of zinc stearate is more than 0.6 weight %, then the strength of the billet (strength of green compact) becomes excessively small (less than 60 kg/mm$^2$). Hence, the handling of the billet in the succeeding step, i.e. the heating step and in the final forming step and the strength of the green compact is small, whereby part of scrap pieces of the billet may be drop off the billet, thereby raising a problem that the final product becomes low in quality.

As described above, from the viewpoints of the handling of the billet, the strength of the compact and the like, the adding weight percent of the lubricant (zinc stearate) to be added to metal scrap is suitably 0.2 to 0.6%. Furthermore, from the viewpoints of improved strength and better handling of the billet, in the composition of metal scrap composed of press chips, shavings and turnings, the weight percent of shaving and turnings is preferably more than 10%.

Description will hereunder be given of the method of manufacturing a pole core of an alternator.

PREFERRED EMBODIMENTS OF THE INVENTION

Embodiment 1

A pole core of an alternator for vehicles has been successfully manufactured based upon the basic concept described above. Detailed description will hereunder be given thereof.

As well known, metal scrap is composed of mixture of press chips, shavings and turnings obtained from steel and castings worked on by various machines. Now, a given magnetic property is required from the pole core of the alternator, and hence, metal scrap obtained from castings is not suitable. Therefore, in this embodiment, metal scrap composed of press chips, shavings and turnings obtained from steel (SPCC. DSCI) was prepared. This metal scrap contains at least 10 weight % of, shavings and turnings, and the dimensions of each scrap piece (diameter of a particle) is of about 30 to 3 mesh.

The thus prepared metal scrap of a precalculated weight is taken, zinc stearate of about 0.5 weight % is added thereto as a lubricant, and the resultant mixture is satisfactorily mixed in a mixer.

Figure 6:
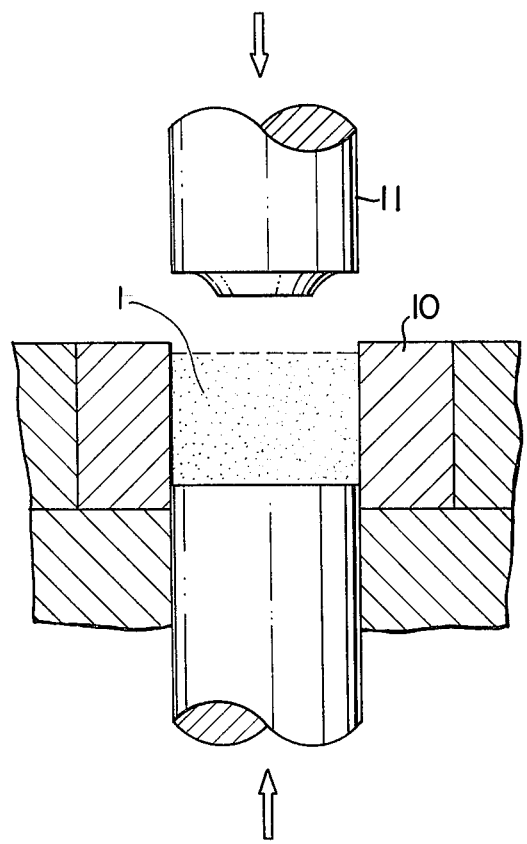
FIG. 6 is a cross-sectional view showing the construction of the die of the press machine for forming a billet from metal scrap.
Figure 7A:
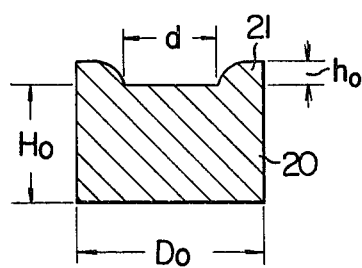
FIG. 7 shows the billet, in which (A) is a longitudinal sectional view thereof and (B) a plan view thereof.
Figure 7B:
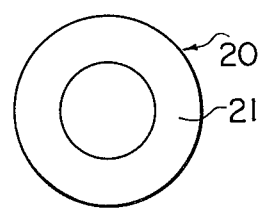

A bottom tool 10 of a press machine is filled up with a mixture 1 of metal scrap with zinc stearate as shown in FIG. 6, compression pressure of 6 to 7 ton/cm$^2$ is applied to the mixture by use of a piston 11, and a billet 20 shown in FIG. 7 is formed under compression. The resultant compact 20 is subjected to a given compression pressure to be formed into a compact wherein the press chips, shavings and turnings of the raw material are interlocked with one another, thus forming a compact having a given mechanical strength.

The billet 20 is of a columnar shape, has a density of about 6.9 to 7.0 g/cm$^3$ and is provided at the top thereof with an annular ridge 21. This annular ridge is, as will be described hereinafter, useful to cause a satisfactory large plastic deformation in the die-forging step or to form a forged workpiece under a small forging pressure. The shape of this billet (dimensions of the respective portions) shall be determined in accordance with the shape of the final forged workpiece. Namely, the shape of the billet shall be determined such that in the die-forging step, material flow to make possible the metallic bond of the scrap pieces is caused at the respective portions of the billet, in other words, the respective portions each show a given plastic deformation rate. In view of this point, in this embodiment, the diameter $D_0$ of the billet is made 75 mm and the height $H_0$ thereof 29 mm. The height $h_0$ of the annular ridge is made 3 mm, and the diameter d thereof 36 mm.

This billet 20 is heated to the forging temperature of 900° to 1000° C. in a radiofrequency induction heating furnace. This heating step is not intended to cause the metallic bond of the scrap pieces of the billet by thermal energy, but, to give satisfactory plasticity for the plastic deformation in the succeeding step, i.e. die-forging step and to give activity to the surfaces of the metal scrap pieces for facilitating the metallic bond at the time of plastic deformation. Consequently, the heating time can be as short as scores of seconds. This heating step shall be not necessarily conducted in the radiofrequency induction heating furnace, but, may be carried out by some other heating device. For example, in the case heating is performed by an electric furnace, the heating time of scores of minutes is required. In this case, it is necessary to conduct the heating step in reducing atmosphere to prevent the surfaces of metal scrap from being oxidated. Consequently, it is advantageous to conduct the heating step in the radiofrequency induction heating furnace which can dispense with the need of heating in reducing atmosphere.

Figure 9A:
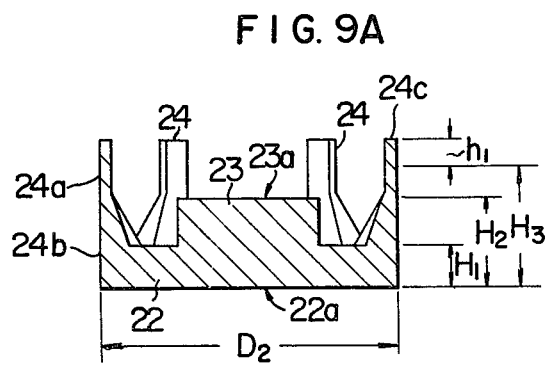
FIG. 9 shows the forged workpiece (a pole core of an alternator) taken out of the press machine for forging, in which (A) is a sectional view thereof and (B) a plan view thereof.
Figure 9B:
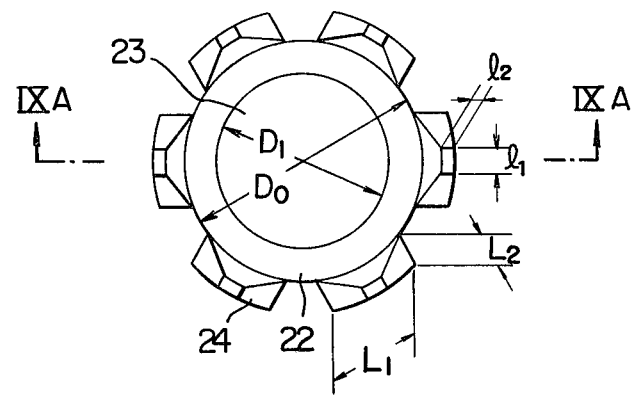

The billet 20 thus heated is forged by a forging press machine shown in FIG. 8 into a forged workpiece i.e. a pole core of an alternator shown in FIG. 9. In this case, the forging pressure amounts to about 15 ton/cm$^2$. As well known, a pole core of an alternator includes a base 22, a center boss portion 23 projecting from the center of the base, and a plurality of claws 24 (normally 6 pieces) axially, equidistantly extending from the marginal portion of the base. The claws 24 are each provided at the forward ends with tip portions 24a, and from the marginal portion of the base 22 to the tip portion 24 thereof with tapered portions 24b.

The pole core of the alternator shown in FIG. 9 shows the condition immediately after the forging by the forging machine shown in FIG. 8, and is provided at the forward ends of the tip portions 24a thereof with burred portions 24c.

The burred portions 24c indicated at the height $h_1$ are to be removed when a finished pole core is turned into the final mechanical part. However, the burred portions each execute an important role in the forging process according to the present invention.

Namely, as apparent from the forging machine shown in FIG. 8, the claws 24 is formed as the result of being subjected to extrusion, and the whole of the claws should be subjected to plastic deformation to satisfactorily receive material flow for causing the metallic bond of the metal scrap pieces. However, the foremost ends 24c of the claws 24 are not subjected to a given plastic deformation rate (Reduction of area is more than 60%.) to cause the metallic bond, and therefore, the given mechanical and physical properties cannot be expected from the foremost ends of the claws 24. Then, as apparent from FIG. 8, according to the present invention, a bur-making semi-closed forging die is used as the forging machine for conduting the forging step, and burred portions 24c are formed at the forward ends of the claws 24. The burred portions 24c are formed in this manner, whereby tip portions 24a and tapered portions 24b of the claws 24 are subjected to satisfactorily large plastic deformation, whereby enabling to form the claws 24 satisfactorily meeting the required mechanical and physical properties. The boss portion 23 is also subjected to extrusion to be formed, and hence, end portions thereof 23a cannot receive satisfactorily large plastic deformation. However, the end portions 23a are compressed by a plunger 100 of a forging press machine to some extent. Furthermore, in the practical use, the surface layers of the ends 23a of several mm in thickness is removed.

The base is mainly subjected to coining and the claws 24 are mainly to extrusion. The shape of the billet 20 is determined such that satisfactorily large upsetting ratio and reduction of area are given when the base 22 and the claws 24 are formed.

Description will be given of one example of the shape (dimensions of the respective portions) of the forged workpiece shown in FIG. 9. The outermost diameter $D_2$ of the forged workpiece including the claws 24 is 97 mm, the outer diameter $D_0$ of the base 22 75 cm equalling to the outer diameter $D_0$ of the billet 20, the outer diameter $D_1$ of the boss portion 23 48 mm, the height $H_1$ of the base 22 12 mm, the height $H_2$ of the boss portion 23 27 mm, the height $H_3$ of the claws 24 in the finished porduct 38 mm, the height $h_1$ of the burred portions 24c formed on the forward ends of the claws 24 about 6 mm, the circumferential length $L_1$ of the tapered portions 24b of the claws 24 25 mm, the radial length $L_2$ of the tapered portions 24b 10 mm, and the circumferential length $l_1$ and the radial length $l_2$ of the tip portions 24a of the claws 24 are 4 mm, respectively.

If the plastic deformation rates for the respective portions of the forged workpiece is sought based upon the above-described values, then the base 22 is mainly subjected to coining and hence the upsetting ratio is about 63%, the boss portion 23 is mainly subjected to extrusion and hence the reduction of area is about 60%, the claws 24 are mainly subjected to extrusion and hence the reduction of area at the tip portions 24a is about 96%, and the reduction of area at the tapered portions 24b is about 83%.

As described above, the respective portions of the forged workpiece are subjected to plastic deformation at a given plastic deformation rate to be formed, the required mechanical properties of the forged workpiece has been satisfactorily satisfied.

The mechanical properties of the forged workpiece, i.e. the pole core according to the present invention as described above have been measured, and hence, the results of the measurement will be shown along with the mechanical properties of the pole core manufactured from the melting material in the following Table 1.

TABLE 1

| Mechanicals & physical properties | | Forging according to the present invention | Pole core made of melting material |
|---|---|---|---|
| Characteristics of pole core | Tensile strength | 33.3–34.4 (kg/mm$^2$) | 34.0–34.5 (kg/mm$^2$) |
| | Elongation | 36–43.5 (%) | 40–46 (%) |
| | Fatigue strength | 15.1 (kg/mm$^2$) | 14–16 (kg/mm$^2$) |
| | Saturated flux density | 15250–16280 (gauss) | 15200–15850 (gauss) |
| Characteristics of rotor assembly | Staking characteristics | less than 0.025 mm | less than 0.015 mm |
| | Centrifugal force test | 0.006 mm | 0.015 mm |
| Characteristics of product | Output characteristics | 56 A | 56 A |

Description will hereunder be given of the functional effects obtained by forming the ridge portion 21 in the billet 20 with reference to FIG. 10.

Firstly, four types of billets designated at A, B, C, and D in FIG. 10 are prepared. These billets are composed of metal scrap identical with one another, and each have the density of aobut 7 g/cm$^3$.

The shapes of the billets are shown in FIG. 10, and the billet A has the same size as the above-described embodiment and has the ridge portion on the top. The billets B and C are columnar in shape, and the billet D is previously provided at the columnar outer peripheral portion thereof with six projections formed on claws.

FIG. 10 shows the height H of the forged workpiece and the forging pressure when the above four types of billets A, B, C and D are die-forged by a forging press machine shown in FIG. 8. As apparent from FIG. 10, with the billet C, a given height of the claws in the forged workpiece (more than 28 mm) could not be obtained. Additionally, with the billet D, a given height of the claws is obtainable though, the height is comparatively small, and an extremely large forging pressure of about 16.5 ton/cm$^2$ was required.

With the billets A and B, a given height of the claws can be obtained, and at the same time, the forging would be performed by a camparatively low value of forging pressure. As apparent from the comparison between the billets A and B, it is understood taht the columnar billet A provided at the top thereof with an annular ridge is superior to the mere columnar billet B in the height of the claws and the forging pressure.

Embodiment 2

The raw material of the billets in the above Embodiment 1 was chippings of steel. In the case the chippings are mixed with the powder having the same material quality as the steel, also the forging having excellent mechanical properties could be obtained. Table 2 shows the mechanical properties of the forgings (manufactured by the manufacturing method described in the Embodiment 1 when the adding ratio of the powder of steel to be added to metal scrap is varied in several ways.

TABLE 2

| Weight of steel chippings in raw material (%) | 80 | 60 | 40 | 20 |
|---|---|---|---|---|
| Weight of iron powder in raw material (%) | 20 | 40 | 60 | 80 |
| Density of forging (g/cm$^3$) | 7.85 | 7.86 | 7.86 | 7.86 |
| Tensile strength (kg/mm$^2$) | 35.5 | 33.2 | 33.6 | 32.1 |
| Elongation (%) | >30 | >30 | >30 | >30 |
| Hardness (HR$_B$) | 61.0 | 60.5 | 57.6 | 53.4 |

In the above embodiment, description was given of the case that iron powder is mixed with metal scrap. However, iron powder (iron powder for sintering) can be disposed on the outer surface of the metal scrap to manufacture the forging. In this case, the appearance of the forging is good, the density thereof is high, hence, the forgings having high commodity value can be manufactured.

Additionally, if reference is made to the method of manufacturing the pole core of the alternator in Embodiment 1, in the case iron powder for sintering are disposed on the surface 22a of the base 22 and the surface 23a of the boss portion 23, the values of the portions in appearance can be improved, and moreover, the mechanical strength can be increased. Hence, still better pole cores of the alternators can be manufactured.

Namely, by disposing metallic powder identical in material quality with the metal scrap at the forward or reaward end of the portion of the billet to be subjected extrusion, in other words, by disposing metallic powder at the portion of the billet not receiving material flow, or the portion not receiving more than a given material flow in order to obtain a given mechanical properties (The dead material flow zone is a general term for those described above.), such a forging can be obtained as having good appearance, and moreover, satisfying the required mechanical properties to a certain extent even in the dead material flow zone.

Embodiment 3

In the above Embodiment 1, which is the manufacturing method of the pole core having a given magnetic property, press chips, shavings and turnings of steel were used as the material of metal scrap. Since the forgings manufactured from such a metal scrap of steel has low machinability, there exists a problem that, with the mechanical parts requiring machining after the die-forging, a considerable increase in cost is entailed.

Then, this embodiment comtemplates to obtain a forging having good machinability by mixing metal scrap of steel with metal scrap of castings having good machinability by nature in the case of manufacturing mechanical parts not requiring to have magnetic property.

For this purpose, such metal scrap was prepared that metal scrap of casting (FC15) is mixed with metal scrap in a proportion shown in Table 3.

TABLE 3

| | Mixing ratio (weight ratio) | | |
|---|---|---|---|
| Casting scrap | 5 | 3 | 1 |
| Steel scrap | 5 | 7 | 9 |

Three types of metal scrap having mixing ratios shown in Table 3, respectively, are formed into forged workpieces in accordance with the manufacturing method of Embodiment 1. Namely, the raw materials of metal scrap are each mixed with 0.5 weight % of zinc stearate as the lubricant, fully (for about 30 min.) mixed by use of a mixer, and thereafter, formed into billets by use of a forming press machine under forming pressure of 6 to 7 ton/cm$^2$. The densities of those billets were about 7 g/cm$^2$, respectively. Thereafter, those billets were heated to the forging temperature of about 900° C. by use of a radiofrequency induction heating furnace, and then, quickly die-forged under forging pressure of 10 to 12 ton/cm$^2$ to be formed into forged workpices.

Table 4 shows the densities of those three forged workpieces and the ratios between the densities of the forged workpiece and the theoretical density.

TABLE 4

| Content of casting scrap (%) | 10 | 30 | 50 |
|---|---|---|---|
| Density (g/cm$^3$) | 7.64 | 7.52 | 7.47 |
| Ratio with theoretical density (%) | 98.5 | 98.5 | 99.5 |

Figure 11:
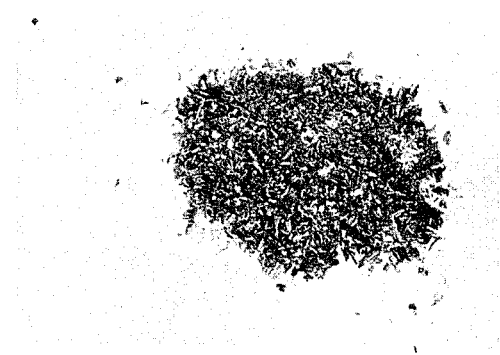
FIG. 11 is a photo-copy showing the shavings and turnings of the forged workpiece produced from metal scrap in which cast iron scrap is mixed with steel scrap and which is subjected to die-forging according to the present invention.
Figure 12:
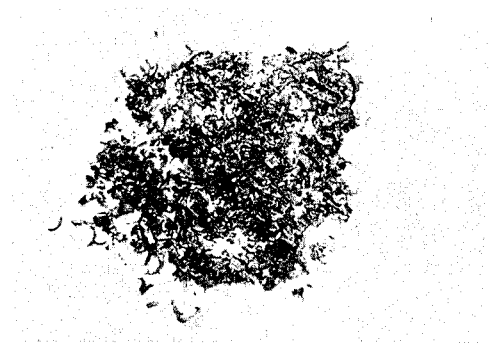
FIG. 12 is a photo-copy showing the shavings and turnings produced from steel scrap containing no cast iron scrap, which is subjected to die-forging according to the present invention.

As apparent from Table 4, in the case the mixture of castings scrap with steel scrap was forged, a forged workpiece having a high density as high as more than 98.5% of the theoretical density could be obtained. Next, reference will be made to the machinability of those forged workpieces. The attached FIGS. 11 and 12 (photo-copies) are photographs showing the appearances of the shavings and turnings of a forged workpiece produced from a mixture of steel scrap with 30% of casting scrap and another workpiece produced from the steel scrap containing no castings scrap. The above shavings and turnings were obtained in the conditions of machining identical with each other (feed rate: 0.056 mm/R; RPM: 125; and cutting tools: 13R-1, SK4-6N). As apparent from these photographs, the forged workpiece produced from the metal scrap containing castings scrap is superior in machinability to the forged workpiece produced from the metal scrap containing no castings scrap.

Table 5 shows the results of the strength evaluating tests conducted on the above three types of forged workpieces.

Figure 13:
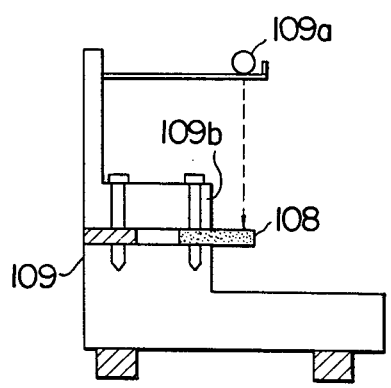
FIG. 13 is a schematic sectional view showing a testing device for evaluating strength.

As shown in FIG. 13, the strength evaluating tests were each conducted in such a manner that a forging 108 as the sample produced by the present embodiment is secured by use of a jig 109b, a steel forging 109a having weight of 1 lb is dropped and impinged onto the sample from a position located 50 cm directly above the sample at a speed of 1 m/sec, the above impingement was repeated, and the evaluation was made by counting the times of impingement till the sample is damaged or deformed to a given angle.

TABLE 5

| Content of casting chippings | 0% | 10% | 30% | 50% | Cast iron (FC-15) |
|---|---|---|---|---|---|
| Repeating time | 14 | 11 | 8 | 4 | 1 |

As apparent from Table 5, the mechanical part made of castings (FC-15) is damaged only at one time of impingement, whereas the forging produced by the present embodiment withstood at least more than four times of the repeated tests, and it was proven that the forging is superior in shock strength to the cast iron.

Needless to say, it is apparent that, the higher the content of castings chippings is, the shock strength is less, and the forging produced by the present embodiment is excellent in shock strength as compared with the mechanical part made of castings.

Embodiment 4

Heretofore, for the forging (mechanical part) requiring the metallic, strength- and magnetic properties that are different from each other in its core portion and its surface layer portion, such a material has been used that can obtain the above-mentioned various properties by being subjected to expensive additional treatments in advance. For example, in the case of the product wherein hardwearing properties, high fatigue strength and high hardness are required from the surface layer and high toughness and low hardness are required from the core portion, low carbon steel is used as the material, subjected to carburizing treatment or carburizing and nitriding treatments after the forging, whereby carbon, or carbon and nitrogen are penetrated into the surface layer, thereafter, the surface layer is hardened, and the core portion is given toughness. However, to harden the surface layer for about 1 mm deep from the surface, this heat treatment requires to maintain high temperature (for example, 900° C.) for as long as about ten hours, thus entailing high costs. Additionally, in the case that the core portion is steel and the surface layer is copper forging, steel material is forged, and thereafter, subjected to copper plating treatment to obtain a mechanical part having a copper surface layer. To copper-plate the surface layer for 0.1 mm deep from the surface, the copper plating treatment requires for as long as ten hours, thus entailing high costs. Additionally, in the case of plating, such a disadvantage is raised that the bond strength between the plated layer and the base metal is low in general.

To solve the above shortcomings, one object of the present embodiment is to provide inexpensive forgings meeting the required properties in such a manner that shavings, small pieces of metal scrap, such as chippings obtained at the time of machining metal materials different in material quality from one another or blanking scrap obtainable at the time of press work, are used as the material for forging, and formed in accordance with the manufacturing method of the aforesaid Embodiment 1.

Figure 14:
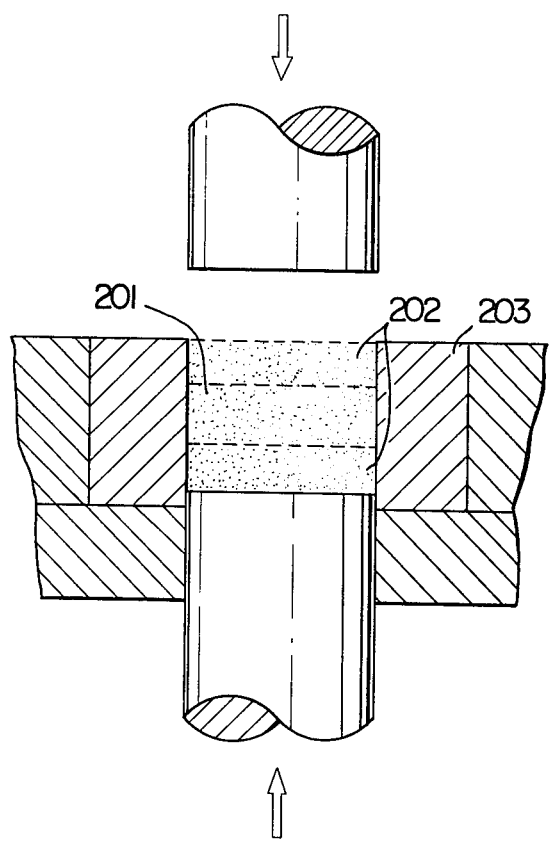
FIG. 14 is a sectional view of the press machine for forming a billet from metal scrap.
Figure 15:
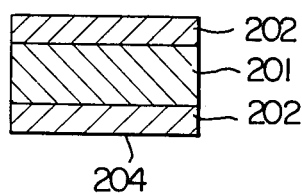
FIG. 15 is a sectional view showing the billet formed by the press machine shown in FIG. 14.
Figure 16:
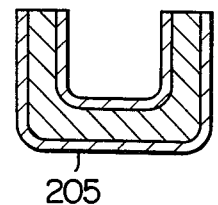
FIG. 16 is a sectional view of the forged workpiece forged from the billet shown in FIG. 15.
Figure 17:
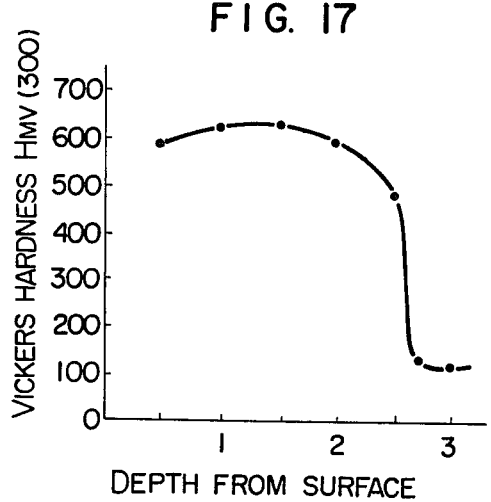
FIG. 17 is a graphic chart showing Vickers hardness when the forged workpiece according to the present invention is subjected to hardening and tempering.

Precalculated weights of the following two types of metal scraps are measured as the raw material, small pieces 201 of a first metal scrap being a mixture of small pieces of blanking scrap of low carbon steel produced at the time of press work with small pieces of shavings and turnings of low carbon steel produced at the time of machinework (in the present embodiment, the small pieces of blanking scrap of press work: 60%; and the small pieces of shavings and turnings: 40%), and small pieces 202 of a second metal scrap being composed of small pieces of shavings and turnings of high carbon steel different in material quality from the small pieces 201 of the first metal scrap, comparatively approximate in melting point thereto and different in heat-treat effect therefrom. These given quantity of the small pieces 201 of the first metal scrap and the small pieces 203 of the second metal scrap are entered a die 203 incorporated in the press machine shown in FIG. 14 in layers of the small pieces 202 of the second metal scrap, the small pieces 201 of the first metal scrap and the small pieces 202 of the second metal scrap from above, and subjected to pressure required for forming (7 ton/cm$^2$), to thereby form a billet 204 as shown in FIG. 15. Next, this billet 204 (density: about 7 g/cm$^3$) is heated to a predetermined temperature (for example, 900° C.), forged by use of a die of press work for forging, so that a forging 205 of a given shape shown in FIG. 16 can be obtained. This forging 205 is hardened by use of a well known hardening device. Examples of numerical values in the present embodiment will hereunder be shown. The small pieces of blanking scrap of low carbon steel produced in the press work and used as the first metal scrap of the raw material each have the maximum dimensions of 10 mm, 7 mm and 0.6 mm, the small pieces of shavings and turnings each have the maximum dimensions of 3 mm, 3 mm and 1 mm, and the mixing ratio is such that six part of the small pieces of blanking scrap produced by press work is taken to four part of the small pieces of shavings and turnings. The small pieces of high carbon steel constituting the small pieces of the second metal scrap are small pieces of shavings and turnings having dimensions less than 3 mm, 3 mm and 1 mm. It is found that an excellent forging having the density more than 7.6 can be obtained by the present embodiment similarly to the preceding embodiment. In addition, FIG. 17 shows the hardness distribution of a forging according to the present invention which has been hardened from 850° C. by a well known hardening device. As the result, it is found that the surface of the forging thus heated is high in hardness, the core portion is low in hardness, the forging has the properties equalling to a forging in which the surface of a melting material is subjected to carburizing and nitriding treatments and thereafter hardened, i.e. such properties that the core portion is hardened low and has toughness, the surface is high in hardness and has resistance to wear an and fatigue strength.

Furthermore, in the above embodiment, the small pieces of the first metal scraps and the second metal scrap were metal scrap produced at the time of machinework, i.e. the so-called chippings. These metal scraps were mixed with metal powder for manufacturing sintered mechanical parts having the material quality similar thereto and sold on the market, respectively, subjected to the same processes as in the above embodiment to be formed into a heated forging. With this forging, the properties equalling to the heated forging produced by the above embodiment.

Additionally, in the above embodiment, the small piece portion of the first metal scrap composed of low carbon steel which is low in hardening effect and heat-treat effect is made to be the core portion, and the small piece portions of the second metal scrap composed of high carbon steel which is high in hardening effect and heat-treat effect are provided on the opposite surfaces of the small piece portion of the first metal scrap. However, in accordance with the application of the product used, the small piece portion of the second metal scrap may be made to be the core portion and the small piece portion of the first metal scrap may be provided on the opposite surfaces of the core portion. Namely, this arrangement may be applied to the product in which high hardness is required for the core portion and flexibility is required for the surface.

Furthermore, in the above embodiment, the small piece portions of the first and second metal scraps form layers. However, the small piece portion of the first metal scrap may be made to be the core portion and the surface of the small piece portion of the first metal scrap can be wrapped by the small piece portion of the second metal scrap. Namely, the small piece portion of the first metal scrap may be embedded in the small piece portion of the second metal scrap, in which case, the same properties as in the above embodiment was obtained. In this case, in accordance with the application of the product used, the small piece portion of the first and second metal scraps may change the positions with each other.

Additionally, for the small pieces of the first and second metal scraps, any small pieces of metal scrap will do which has the material quality yielding hardening effect and heat-treat effect.

Embodiment 5

In the above Embodiments 1 through 4, all of metal scraps used as the raw materials were iron. However, similarly good results were obtained with non-ferrous metals.

The following Table 6 shows the measured values of the forming-heating conditions and the various mechanical properties when the forgings according to the present invention were produced from the scrap of the non-ferrous metals.

TABLE 6

| | Raw material | Copper scrap | Brass scrap | Aluminum scrap |
| --- | --- | --- | --- | --- |
| Working conditions | Billet forming pressure (ton/cm$^2$) | 6.0–7.0 | 6.0–7.0 | 5.0 |
| | Billet density (g/cm$^3$) | 7.5–8.0 | 7.3–7.6 | 2.0–2.1 |
| | Heating temperature (°C.) | 800 | 700 | 400 |
| | Forging pressure (ton/cm$^2$) | 10–12 | 10–12 | 10–12 |
| | Theoretical density ratio (%) | 97 | 99 | 97 |
| Mechanical properties of forged workpiece | Tensile strength (kg/mm$^2$) | 20–23 | 31–38 | 28–33 |
| | Elongation (%) | 28–40 | 20–25 | 3–6 |
| | Hardness (Hv) | 100–110 | 52–60 | 66–70 |

What is claimed is:

1. A method of manufacturing a pole core of an alternator comprising a base portion, a boss portion, and at least one claw, from metal scrap, comprising the steps of,
   preparing metal scrap comprising press chips, shavings and turnings;
   forming a billet by pressing the metal scrap;
   heating the billet to the forging temperature, whereby a satisfactory plasticity is given to the billet for plastic deformation of metal scrap in the succeeding process; and
   forming the heated billet into a pole core of an alternator by use of a semi-closed forging die means, the shape of said pole core being selected such that substantially every part of said billet is deformed plastically by a degree of deformation sufficient to generate metallic bond at said substantially every part of the billet.

2. A method according to claim 1, wherein said metal scrap contains more than 10 weight percent of shavings and turnings.

3. A method according to claim 1 or 2, wherein said metal scrap contains 0.2 to 0.6 weight percent of zinc stearate.

4. A method according to claim 2, wherein said metal scrap contains metal powder having the material quality equalling to said metal scrap.

5. A method according to claim 1 wherein said heating process is carried out in a radiofrequency induction heating furnace.

6. A method according to claim 1 or 2, wherein the forged workpiece is given plastic deformation having more than 30% of the upsetting ratio.

7. A method according to claim 1, wherein said billet is of a columnar shape, the diameter thereof being more than about 1.6 times the diameter of the boss portion of the pole core, and the height thereof being more than about 1.5 times the height of the base portion of said pole core.

8. A method according to claim 7, wherein said billet has an annular ridge portion at an end portion opposite to the end portion where the claws of the pole core are formed.

9. A method according to claim 1 which further includes reducing the area of said boss portion and said claws as compared to the billet by more than 60%.

10. A method according to claim 1 which further includes disposing said metal powder in the portions of said billet forming said base and said boss portion.

11. A method of manufacturing mechanical parts from metal scrap, comprising the steps of,
    preparing high and low carbon steel scrap comprising press chips, shavings and turnings;
    making a first layer from said high carbon steel scrap;
    placing a second layer from said low carbon steel scrap on said first layer;
    placing a third layer from said high carbon steel scrap on said second layer;
    forming a billet by pressing said layers of scrap; heating the billet to the forging temperature, whereby a satisfactory plasticity is given to the billet for plastic deformation of metal scrap in the succeeding process;
    forming the heated billet into a die-forged workpiece by use of a semi-closed forging die means, the shape of said die-forged workpiece being selected such that substantially every part of said billet is deformed plastically by a degree of deformation sufficient to generate metallic bond at said substantially every part of the billet; and,
    hardening said die-forged workpiece to increase the surface hardness.

12. A method according to claim 11, wherein said metal scrap contains more than 10 weight percent of metal scrap of castings.

* * * * *